No. 692,270. Patented Feb. 4, 1902.
H. E. GRABAU.
MACHINE FOR MAKING CIGARETTES.
(Application filed Oct. 5, 1898.)
(No Model.) 6 Sheets—Sheet 1.

Witnesses
J. G. Hinkel
A. E. Hansmann.

Inventor
H. E. Grabau
by
Attorneys

THE NORRIS PETERS CO., PHOTO-LITHO., WASHINGTON, D. C.

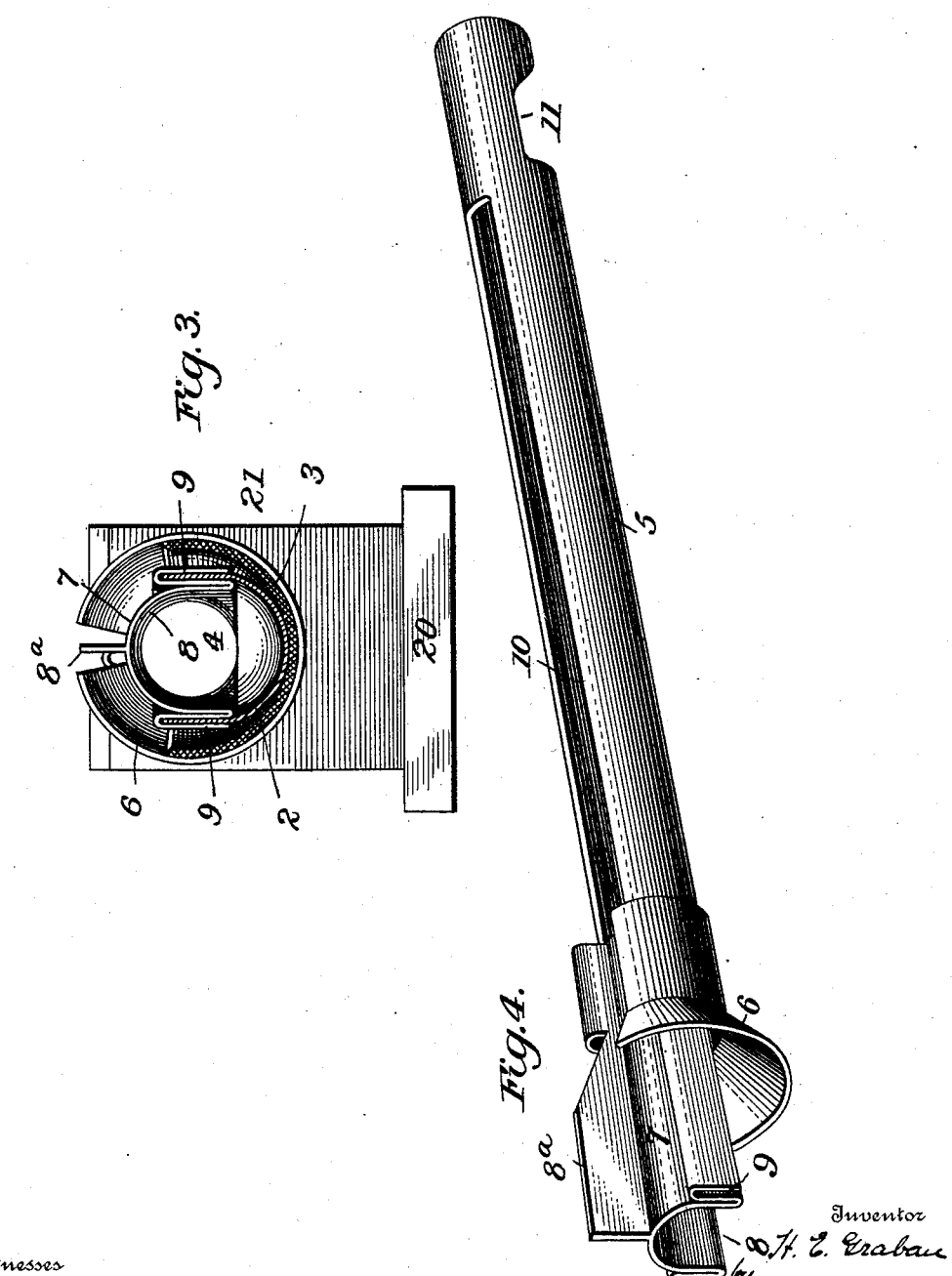

No. 692,270.  
H. E. GRABAU.  
MACHINE FOR MAKING CIGARETTES.  
(Application filed Oct. 5, 1898.)
Patented Feb. 4, 1902.
(No Model.)
6 Sheets—Sheet 3.
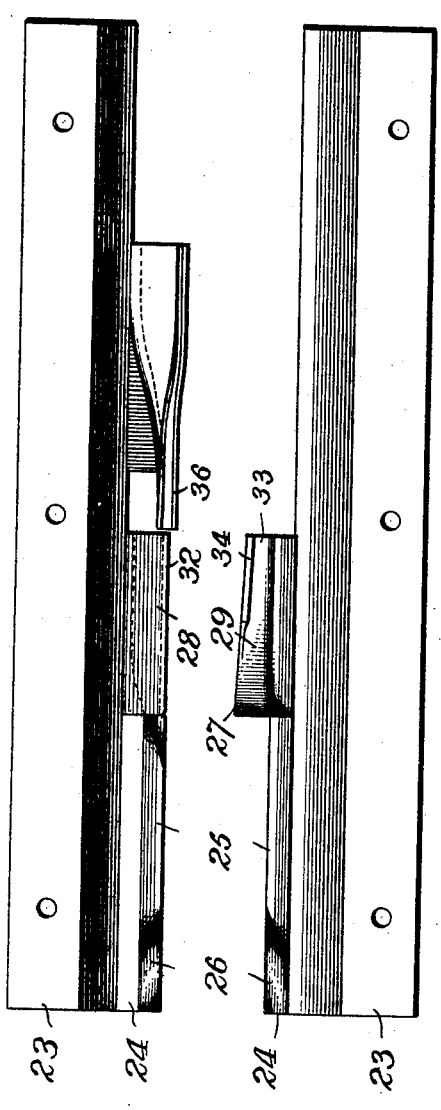
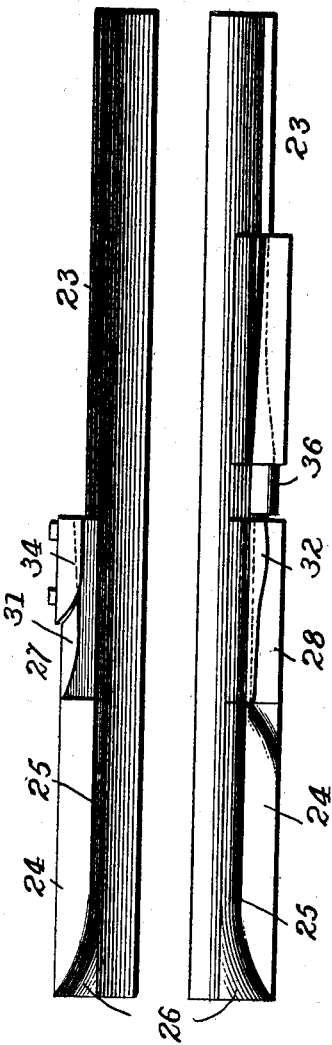

No. 692,270. Patented Feb. 4, 1902.
H. E. GRABAU.
MACHINE FOR MAKING CIGARETTES.
(Application filed Oct. 5, 1898.)
(No Model.) 6 Sheets—Sheet 4.
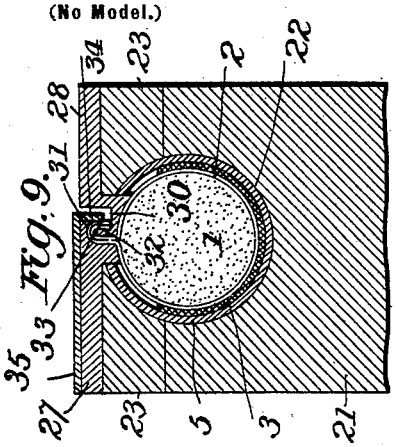
Fig. 9.
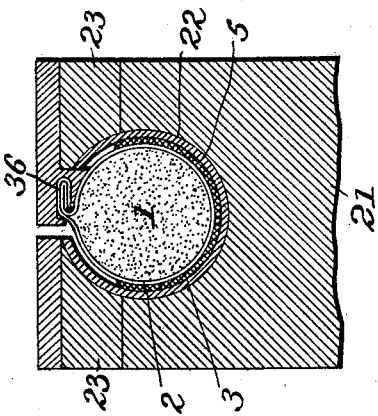
Fig. 12.
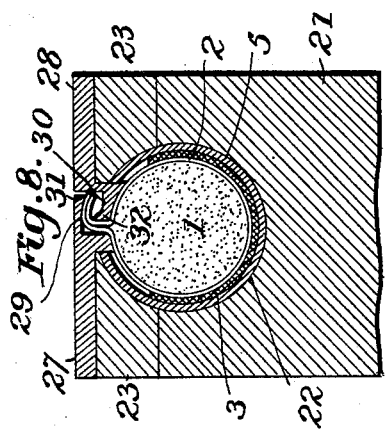
Fig. 8.
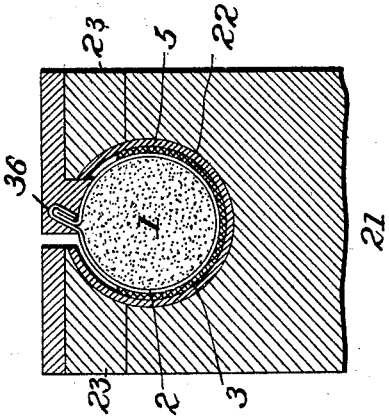
Fig. 11.
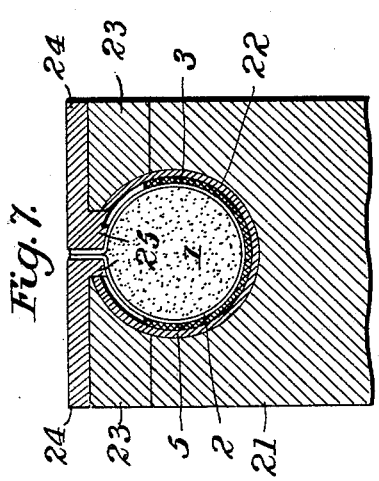
Fig. 7.
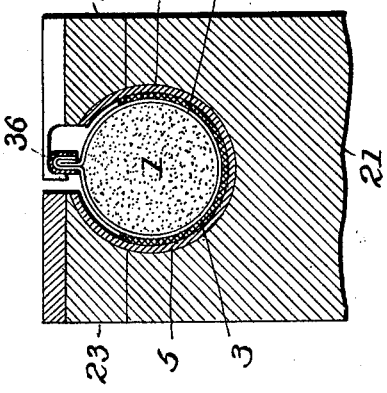
Fig. 10.
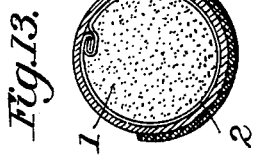
Fig. 13.
Witnesses
Inventor
Hans Edgar Grabau
Attorneys

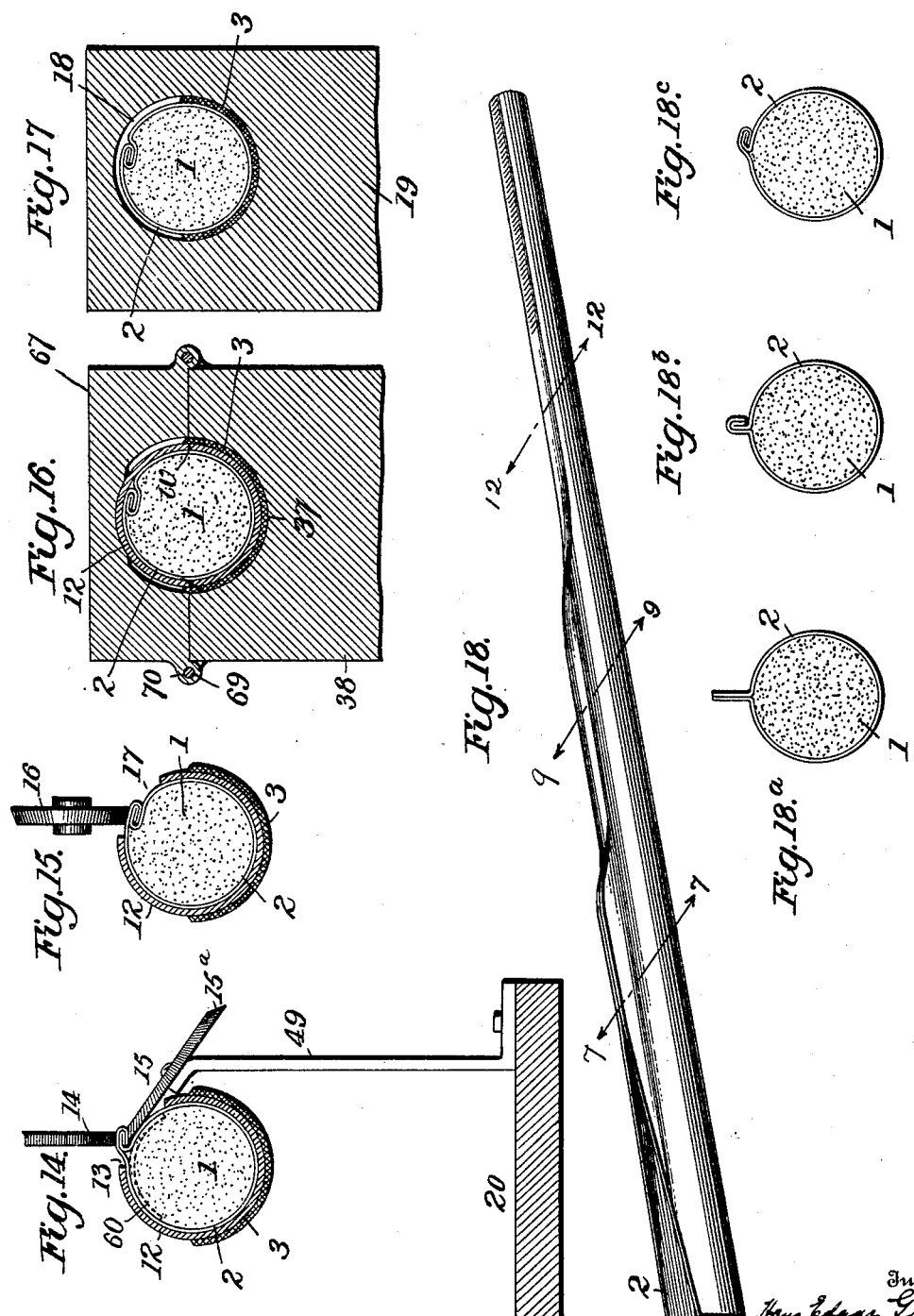

No. 692,270. Patented Feb. 4, 1902.
H. E. GRABAU.
MACHINE FOR MAKING CIGARETTES.
(Application filed Oct. 5, 1898.)
(No Model.) 6 Sheets—Sheet 6.
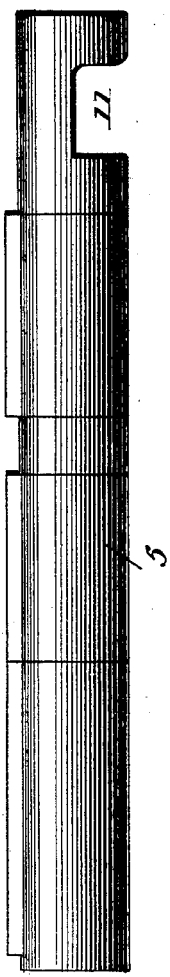
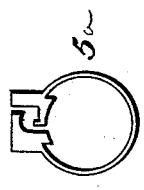
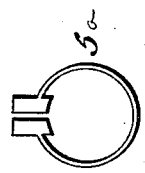
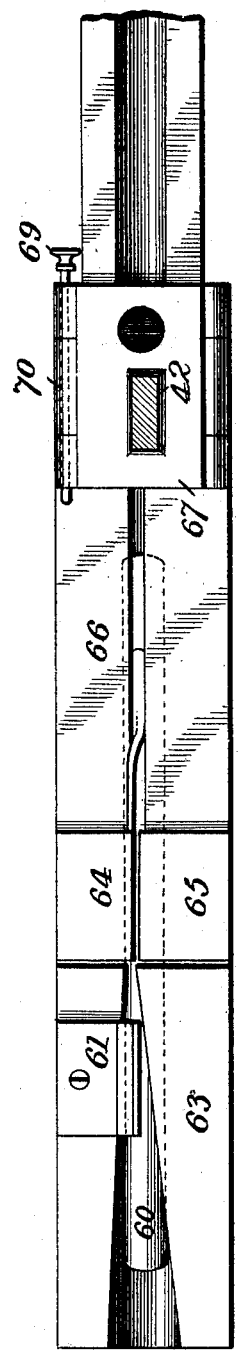

UNITED STATES PATENT OFFICE.

HANS EDGAR GRABAU, OF HOBOKEN, NEW JERSEY, ASSIGNOR TO THE GARCIA-RABELL TRADING COMPANY, OF NEW YORK, N. Y., A CORPORATION OF NEW YORK.

MACHINE FOR MAKING CIGARETTES.

SPECIFICATION forming part of Letters Patent No. 692,270, dated February 4, 1902.

Application filed October 5, 1898. Serial No. 692,712. (No model.)

*To all whom it may concern:*

Be it known that I, HANS EDGAR GRABAU, a subject of the Emperor of Germany, residing at Hoboken, in the county of Hudson and State of New Jersey, have invented certain new and useful Improvements in Machines for Making Cigarettes, of which the following is a specification.

This invention relates to certain new and useful improvements in machines for the manufacture of cigarettes, and more especially that class of cigarettes in which the wrapper-strip is secured to the tobacco filler by folding its edges together and permanently uniting them by indenting or crimping; and the objects of the invention are to simplify the construction and operation of machines of this character, to increase their efficiency and capacity, and to generally improve them, so that a superior cigarette may be produced at a comparatively slight cost.

To these ends the invention consists in the construction and arrangement of parts substantially as hereinafter set forth, and illustrated in the accompanying drawings, in which—

Figure 1:
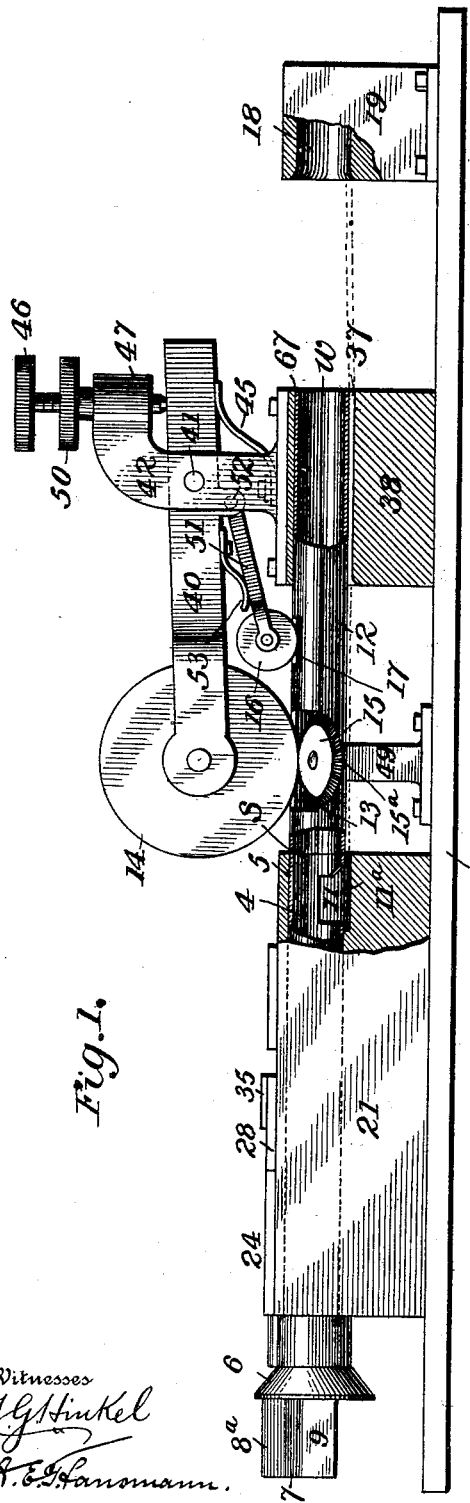
Figure 2:
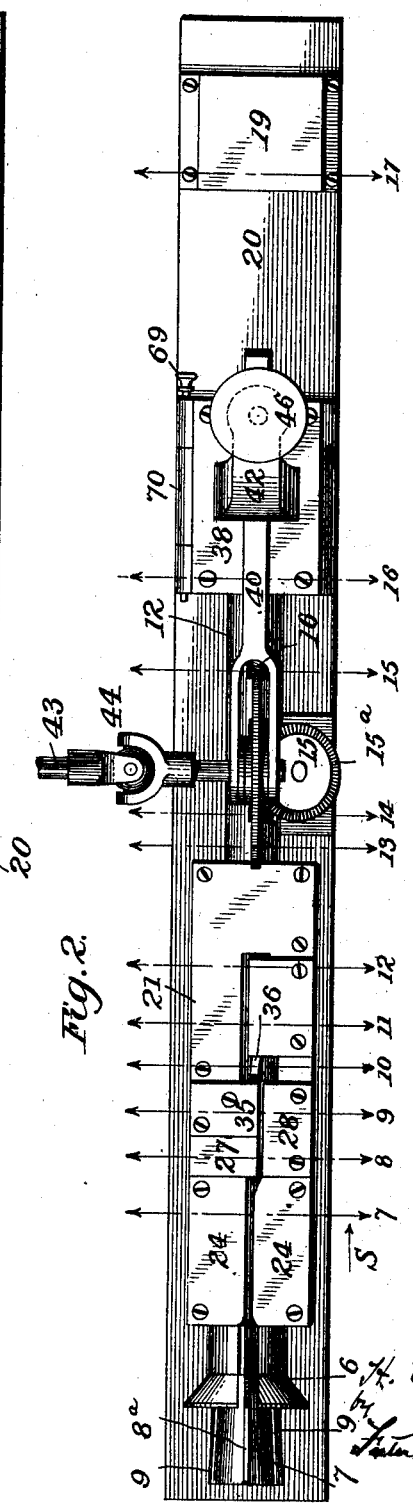

Figure 1 is a side view, partly in section, of the folding and crimping mechanism of a cigarette-machine embodying my improvements. Fig. 2 is a plan view. Fig. 3 is a front end view. Fig. 4 is a perspective view of the guide and tube detached. Fig. 5 is an inverted plan view, on an enlarged scale, of the paper-folders detached. Fig. 6 is an inner edge view of the folders detached, one series of the folders being shown inverted. Figs. 7 to 17 are cross-sectional views taken, respectively, on the dotted lines 7 to 17 of Fig. 2 and looking in the direction of the arrow S. Fig. 18 is a perspective view of a section of the tobacco filler and its wrapper-strip, illustrating the successive steps in the process of folding and securing the edges of the strip around the filler. Figs. 18$^a$ to 18$^c$ are cross-sections taken, respectively, on the dotted lines 7 7, 9 9, and 12 12 of Fig. 18; and Figs. 19 to 21 are views illustrating a modification. Fig. 22 is a plan view of another modification.

The present improvements pertain particularly to the devices for applying and securing the wrapper-strip to the tobacco rod or filler and may be employed in connection with any suitable means for preparing and feeding the loose tobacco and for compressing and molding it into a continuous rod and delivering it upon the wrapper-strip preparatory to being inclosed therein, and any preferred form of cutting devices may also be used to sever the finished cigarette-rod into proper lengths for commercial cigarettes. It may further be stated that while the invention is specially applicable to machines for making crimped cigarettes it is not to be limited in this respect, as many of the features thereof are equally serviceable in that class of cigarette-machines in which the edges of the wrapper-strip are folded and secured by paste.

Before describing the details of construction of the machine the general arrangement and operation of the main parts thereof which coact to inclose the tobacco filler in the wrapper-strip and to fold together and permanently unite the edges of the latter will be set forth.

A continuous tobacco rod 1, formed in any appropriate way, is fed upon a paper wrapper-strip 2, which preferably, though not necessarily, is supported upon and carried forward, with the filler, through the folding devices by an endless carrier-belt 3, as usual in machines of this kind. The belt, wrapper-strip, and filler then pass together into a cylindrical folding-chamber 4, within a tube 5, Figs. 1 and 4, provided at its forward or receiving end with a flaring or bell-shaped mouthpiece 6, by which the belt and wrapper-strip are gradually folded closely around the filler into tubular form.

A guide 7, Fig. 4, having a tapering central channel 8 for the passage of the filler and two converging side channels 9 9, adapted to receive the edges of the wrapper-strip, extends into the mouthpiece 6 in position to direct the said edges, standing at first vertically, as in Fig. 7, through an elongated opening or slot 10 in the upper side of the tube 5 and in between a series of folding-blades. These folding-blades are of peculiar construction and arrangement, as will fully appear hereinafter, and are so disposed with relation to the slot 10 that the standing edges of the wrapper-strip are first brought closely together side by side, Figs. 7 and 18ª, are then gradually doubled over upon themselves, Figs. 8, 9, and 18ᵇ, and thereafter again folded over toward or upon the body of the cigarette-rod, Figs. 12, 13, and 18ᶜ. I thus make a double fold and press the latter onto the body of the wrapper and within the bore or limits of the tube 5, so that the filler is held compressed and there is no slack in the tube to permit the loosening of the filler. The carrier-belt 3 now preferably leaves the cigarette-rod, and the latter continues on alone through a tubular guide 12, Figs. 1 and 13, into an opening 13 of which extend the coöperating serrated edges of crimping-wheels 14 15, between which the folded edges of the wrapper-strip pass, Fig. 14, and are crimped, and thus interlocked to form a permanent union, as will be understood. The crimped fold is thereafter conducted under a presser-wheel 16, extending into an opening 17 in the guide-tube 12, Figs. 1 and 15, and is thereby pressed down and flattened upon the body of the cigarette-rod to form a finished seam.

During the passage of the cigarette-rod through the guide-tube 12 the carrier-belt 3 continues outside of and below the latter and preferably in contact therewith, Fig. 13 and dotted lines Fig. 1, and again joins the cigarette-rod as it emerges from the rear end of the guide-tube, and then passes on with it through a chamber 18, Figs. 1 and 17, in a block 19, arranged at a convenient distance from the guide-tube 12, and in which chamber the cigarette-rod is subjected to a slight pressure to give the article the desired finish. The cigarette-rod may then be delivered to a suitable cutter to be severed into cigarettes.

Having thus briefly set forth the general arrangement and operation of the parts of the improved folding devices, I will now proceed to describe their construction and relation more in detail.

On a bed-plate 20 is a support or bearing-block 21, having in its upper portion a semicircular groove 22, forming a seat for the tube 5, which is detachably and adjustably secured therein by clamping-plates 23 23, bolted to the block and engaging and conforming to the sides of the tube adjacent to their edges. The bearing-block 21 affords a strong support for the tube, and as the latter is a separate piece it may be highly polished and finished and more easily repaired than if the block itself were used.

The bell-shaped mouthpiece 6, as preferred, is removably fitted upon the front end of the tube 5, and its inner wall at the contracted end conforms to the interior diameter of the tube, so as to present a smooth and unbroken surface therethrough.

The guide 7, made of sheet metal, bent, as shown, to form the tapering channel 8 and converging side channels 9 9, is suspended partly within the mouthpiece by an arm 8ª, carried by the latter, and to the lower end of which arm the guide may be attached by solder or otherwise.

The construction and relative arrangement of the devices for folding the edges of the wrapper-strip together may be varied somewhat, according to circumstances; but as preferred there are two guide-plates 24 24 immediately in rear of the mouthpiece 6 and bolted upon the plates 23 23. These guide-plates are separated slightly and are each provided with a rib 25, arranged within the slot 10 of the tube 5, and which may and preferably does project into the interior of the latter to an extent equal to the thickness of the carrier-belt 3. The under face of the rib is concave in cross-section, and at its forward end the rib is beveled off, as at 26, Fig. 5. These beveled portions 26 26 of the ribs occupy positions above and about in line with the inner ends of the channels 9 9 of the guide 7 and facilitate the entrance of the edges of the wrapper-strip in between the plates and operate to bring said edges gradually into close contact. In rear of the guide-plates 24 24 are folding-plates 27 28, the inner adjacent portions 29 30 of which overlap and are so shaped on their opposing faces as to form, in effect, an intermediate passage of spiral form. Thus the under side of the portion 29 is of gradually-increasing concavity in cross-section and terminates at its edge in a rib 31 of slightly-increasing depth from front to rear, Fig. 6, while the opposing portion 30 of the plate 28 is likewise provided with an edge rib 32, the upper face of which is inclined upward, so that as the edges of the wrapper-strip pass between the two ribs 31 32 they are folded over the rib 32, Fig. 9, by the rib 31 until the edges are formed into a substantially U-shaped bead or fold.

As the bead or fold passes along the rib 32 of the plate 28 it enters a gradually-contracting groove 33, formed by the side of the rib 32, the under side of the rib 31, and the dependent flange 34 of an overlying plate 35, Fig. 9, and as the bead passes through the said groove the two limbs thereof are made to lie flat against the sides of the rib 32. From the contracted groove 33 the bead, which is in a substantially vertical relation to the main body of the partially-completed cigarette-rod, passes from the rib 32 and into the inverted-U-shaped mouth of a final folder 36. This serves the purpose of gradually turning the bead so that it will lie flat against or in close proximity to the body of the cigarette-rod, and in order to effect this the channel therethrough is of substantially spiral form, gradually changing from the vertical at its mouth, Fig. 10, to the horizontal at its rear end, Fig. 12. From the final folder the cigarette-rod continues in its passage through the tube 5 and enters the closed guide-tube 12, which preferably, though not necessarily, is of slightly less interior diameter than the said tube 5 in order to prevent the expansion of the cigarette-rod due to the absence of the carrier-belt at this point.

The wall of the tube 5 is cut away at 11, Figs. 1 and 4, and the adjacent portion of the block 21, Fig. 1, is likewise cut away to provide a passage 11$^a$, so that the carrier-belt may pass readily from the tube 5 and away from the cigarette-rod, which, as stated, moves alone through the guide-tube 12, the belt meantime passing under the latter and through a passage 37 in a support 38, in which the guide-tube 12 is secured, as best shown in Figs. 1 and 16. As the cigarette-rod leaves the guide-tube 12 it again meets the belt and passes therewith through the chamber 18, as before described.

The forward end of the guide-tube 12 at $s$, Fig. 1, is slightly enlarged to facilitate the entrance of the cigarette-rod therein and preferably extends into close proximity to the end of the tube 5, so that the cigarette-rod may be properly supported in its passage from one tube to the other.

Any suitable devices for crimping the folded edges of the wrapper-strip may be employed; but as preferred a crimping-wheel 14, having a serrated or otherwise roughened peripheral edge, is mounted in bearings in the end of a lever 40, pivoted at 41 in a standard 42, rising from the support 38, and this wheel coacts with a wheel 15 on an inclined shaft journaled in bearings in a standard 49, resting on the base 20 and bolted adjustably thereto. The upper side of the wheel 15 is beveled off at the edge and serrated or roughened to form a crimping-surface 15$^a$, the effective portion of which occupies a substantially horizontal plane immediately below the wheel 14, the two wheels entering the tube 12 through the opening 13 in a position to engage the opposite sides of the folded edges of the wrapper-strip, Fig. 14, and effectually crimp the same, the comparatively sharp edge of the wheel 15 passing readily between the body of the cigarette-rod and the folded edges and forming a support for the latter during the crimping operation. By this arrangement of the lower wheel it will resist the downward thrust of the upper wheel better than if it were horizontal.

The wheel 14 is positively driven by a shaft 43, connected thereto by a universal joint 44, while the wheel 15 is free to revolve in its bearings, and the wheel 14 is pressed toward the wheel 15 by a spring 45, acting on the rear end of the lever 40, a thumb-screw 46, screwing through a threaded bearing 47 of the standard 42, serving as an adjustable stop to limit the downward movement of the wheel 14, as required. A stop-nut 50 on the screw 46 when properly adjusted thereon insures a ready and correct readjustment of the parts when for any reason the position of the screw in its support has been disturbed.

The presser-wheel 16 is journaled in the free end of an arm 51, pivoted at 52 to the standard 42, and a spring 53, arranged to bear on the arm, serves to force the wheel down through the opening 17 of the tube 12 upon the crimped fold of the cigarette-rod with a yielding pressure, thus insuring the proper flattening of the fold to make a finished seam.

In the modification shown in Figs 19 to 21 the slotted tube 5$^a$ is made in short sections, and the folding devices or blades are formed integral therewith instead of being separate and detachable, as in the construction before described. When in use, these sections are arranged end to end, so as to constitute, in effect, a continuous tube with an unbroken interior surface.

The support 38 is divided horizontally, Fig. 16, the upper part 67 being hinged to the lower part, and the guide-tube 12 is divided on the line $w$, so that the part 67 and the standard 42 and connected devices may be swung over to expose the channel and permit the ready insertion and removal of the rod or paper strip. The parts are held in place in operation by a pin 69, passing through hollow projections 70 on the two parts 38 67. (See Fig. 22.)

The crimping-wheel 15 may in some cases be positively driven. Some kinds of tobacco in some cases may not constitute a sufficient support for the final pressure upon the seam, as in crimping, if but one wheel 14 is used. In such case a firm support may be had by a blade 60, supported by a bracket 61 in the channel of the guide-tube 12 and extending below the wheels 14 16. (See Fig. 22 and dotted lines, Fig. 14.) In Fig. 22 there are plates 63 64 65 66, which fold over the edges of the paper strip prior to the action of the crimpers.

It will be apparent that the improved folding devices may, if desired, be used in machines for making cigarettes in which the folded edges of the wrapper-strip are secured by paste instead of by crimping. In such case a suitable pasting device, preferably a disk adapted to enter and apply paste between the folded edges of the wrapper and the body portion of the cigarette-rod, is substituted for the crimping-wheels, the parts of the machine being in other respects substantially the same as already described.

Without limiting myself to the precise construction and arrangement of parts set forth, I claim—

1. The combination with a longitudinally-slotted tube, of folding devices extending into the slot of the tube for folding the edges of a wrapper-strip with a double fold to a position within the tube, a guide-tube constituting a continuation of the slotted tube, having openings through the walls thereof, crimping devices extending into one of the openings of the guide-tube, and a presser device extending into the other of said openings, substantially as set forth.

2. The combination with a longitudinally-slotted tube having a bell-shaped mouthpiece, the guide therein, and the folding devices extending into the slot of the tube for folding the edges of a wrapper-strip, of a guide-tube having openings in its wall, crimping devices extending into one of said openings of the guide-tube, a presser device extending into the other opening thereof, and a carrier-belt arranged to pass through the first-named tube and along the exterior of said guide-tube, substantially as set forth.

3. The combination with the supporting-block having a semicircular groove in its upper portion, of a separate slotted tube adjustably seated therein, and clamping-plates secured to the block and engaging said tube at their inner ends, substantially as set forth.

4. The combination with the supporting-block having a semicircular groove in its upper portion, of a slotted tube adjustably seated therein, clamping-plates secured to the block and engaging said tube at their inner ends, and folding devices supported on said clamping-plates and extending into the slot of the tube, substantially as set forth.

5. The combination with the slotted tube having an opening in its lower wall near the rear end, means for supplying the wrapper-strip and the filler to said tube and the folding devices coöperating with said tube, of a guide-tube in line with said slotted tube and having an opening in its wall, crimping devices extending into the opening of the guide-tube, and a carrier-belt adapted to travel through the slotted tube and out therefrom through said opening therein below the crimping devices, substantially as set forth.

6. The combination with the slotted tube and the detachable bell-shaped mouthpiece therefor, of a guide supported opposite and projecting at one end into said mouthpiece and provided with a central tapering channel and two converging side channels, guide-plates having ribs extending downward into the slot of the tube and provided with beveled faces in line with the inner ends of said side channels, and folding devices in rear of said guide-plates, substantially as set forth.

7. The combination with the support composed of two parts hinged together, of a guide-tube mounted in the support, and operating devices carried by the upper part of the support, substantially as set forth.

8. The combination with the horizontally-divided support the parts of which are hinged together at one side, of a horizontally-divided guide-tube carried by the support, and operating devices mounted on the upper part of the support, substantially as set forth.

In testimony whereof I have signed my name to this specification in the presence of two subscribing witnesses.

HANS EDGAR GRABAU.

Witnesses:
C. J. METCALFE,
LUIS CAESTRO LOPEZ.